(12) United States Patent
Kiga et al.

(10) Patent No.: US 7,119,967 B2
(45) Date of Patent: Oct. 10, 2006

(54) IMAGE PICK-UP DEVICE AND ADJUSTMENT MECHANISM

(75) Inventors: Kazuyoshi Kiga, Tokyo (JP); Noriaki Sakata, Tokyo (JP); Tadasu Kobayashi, Saitama (JP); Takao Ozaki, Saitama (JP)

(73) Assignees: Sony Corporation, Tokyo (JP); Fujinon Corporation, Saitama (JP)

( * ) Notice: Subject to any disclaimer, the term of this patent is extended or adjusted under 35 U.S.C. 154(b) by 0 days.

(21) Appl. No.: 11/146,010

(22) Filed: Jun. 7, 2005

(65) Prior Publication Data

US 2005/0270670 A1 Dec. 8, 2005

(30) Foreign Application Priority Data

Jun. 8, 2004 (JP) ............................. 2004-170402

(51) Int. Cl.
*G02B 15/14* (2006.01)
*G02B 7/02* (2006.01)

(52) U.S. Cl. ...................................... 359/694; 823/704
(58) Field of Classification Search ................ 359/819, 359/820, 822, 823, 694, 703, 704
See application file for complete search history.

(56) References Cited

U.S. PATENT DOCUMENTS 5,400,073 A   3/1995  Morioka et al. ............ 348/335
6,104,549 A *  8/2000  Iwasaki ..................... 359/694
6,970,304 B1* 11/2005  Makii et al. ................ 359/696
2005/0007679 A1* 1/2005  Makii et al. ................ 359/694

FOREIGN PATENT DOCUMENTS

JP         06-78190 A        3/1994

* cited by examiner

*Primary Examiner*—Ricky Mack
*Assistant Examiner*—M. Hasan
(74) *Attorney, Agent, or Firm*—Birch, Stewart, Kolasch & Birch, LLP (57) ABSTRACT

When the adjusting shaft is rotated, the rotation of the adjusting shaft is transmitted to the rotationally movable barrel. The rotationally movable barrel rotates so that the rotationally movable barrel moves forward and backward along optical axis while rotating due to the interaction between the female screw portion formed in the distal end of the rotationally movable barrel and the male screw portion formed in the second flange portion of the fixed barrel. The forward and backward movement of the rotationally movable barrel along optical axis causes the rectilinearly movable barrel connected to the connecting portion of the rotationally movable barrel through the groove, to move forward and backward along optical axis. Accordingly, the CCD fixed to the rectilinearly movable barrel through the CCD carrier moves forward and backward along optical axis, thereby correcting the flange-back length.

16 Claims, 7 Drawing Sheets

IMAGE PICK-UP DEVICE AND ADJUSTMENT MECHANISM

BACKGROUND OF THE INVENTION

1. Field of the Invention

The present invention relates to an image pick-up device and an adjustment mechanism, and more specifically, to an image pick-up device that adjusts flange-back length in lens replacement and an adjustment mechanism used for the image pick-up device.

2. Related Art

In typical cinematography, a cinematographer makes, before using a camera, a test using a device configuration same as that used in action take and makes calibration of range indicator for lenses. The cinematographer takes action with reference to the calibrated range indicator. If the flange-back length of the camera is not correct, the lens cannot provide its possible performance.

In conventional camera production, the flange-back length is fixed to a length defined by a reference lens. Accordingly, there is a problem that a camera cannot be adapted for the case where a difference exists between a lens to be used and the reference lens or the case where the flange-back length should be modified due to a lens condition.

Accordingly, Japanese Patent Application Laid-open No. 6-78190 proposes a technique in which a camera has a flange-back adjusting mechanism. The flange-back adjusting mechanism has a configuration in which a holder having a solid-state image sensor mounted thereon is supported movably forward and backward by a pair of guide rods, is pressed and urged by a pressing coil spring, and is pressed against a adjusting ring screwed into a threaded through hole for mounting an optical lens. The rotation of the adjusting ring causes forward or backward movement of the solid-state image sensor, thereby adjusting the flange-back.

SUMMARY OF THE INVENTION

However, conventional flange-back adjusting mechanism has a problem that highly accurate adjustment is not available because of the simple configuration in which a holder movably supported by guide rods is pressed and urged by a pressing coil spring against an adjusting ring.

The present invention is made in view of the above problem, and has an object to provide an image pick-up device that allows adjustment of the flange-back length with high accuracy and an adjustment mechanism used for the image pick-up device.

To achieve the above object, a first aspect of the present invention provides an image pick-up device which has a lens removably mounted to a lens mount provided to a device body, and receives light coming through the lens by a solid-state image sensor, the image pick-up device comprising: a fixed barrel which is fixed to the device body; a rectilinearly movable barrel which has a distal end fitted into the fixed barrel and rectilinearly moves along a optical axis; a solid-state-image-sensor holding member which is provided to the rectilinearly movable barrel and holds the solid-state image sensor; a rotationally movable barrel which moves forward and backward along the optical axis with rotation, and has a female screw portion provided to an inner periphery of the rotationally movable barrel, the female screw portion being screwed on a male screw portion provided to an outer periphery of the fixed barrel; an adjusting shaft which has a driving gear portion connected to a driven gear portion provided in an outer periphery of the rotationally movable barrel; a connecting portion which is provided to the rotationally movable barrel, is fitted into a groove formed in an outer periphery of the rectilinearly movable barrel, and connects the rotationally movable barrel and the rectilinearly movable barrel; a first urging member which is interposed between the connecting portion and one inner wall of the groove and eliminates backlash between the connecting portion and the groove by pressing the connecting portion against the other inner wall of the groove; and a second urging member which is interposed between the fixed barrel and the rectilinearly movable barrel and eliminates backlash between the female screw portion and the male screw portion by urging the rectilinearly movable barrel backward along the optical axis against the fixed barrel, wherein rotation of the adjusting shaft is transmitted to the rotationally movable barrel through the driving gear portion and the driven gear portion so as to move the rotationally movable barrel with rotation along the optical axis, so that the rectilinearly movable barrel is rectilinearly moved along with the rotationally movable barrel along the optical axis through the groove and the connecting portion, thereby adjusting the position of the solid-state image sensor.

According to the first aspect, when the adjusting shaft is rotated, the rotation of the adjusting shaft is transmitted through the driving gear portion to the driven gear portion to rotate the rotationally movable barrel. The rotationally movable barrel, provided with rotation power, moves forward and backward along the optical axis with rotation due to the interaction between the female screw portion provided to the inner periphery of the rotationally movable barrel and the male screw portion provided to the outer periphery of the fixed barrel. The forward and backward movement of the rotationally movable barrel along the optical axis causes the rectilinearly movable barrel connected to the rotationally movable barrel through the connecting portion and groove provided thereto to move forward and backward along with the rotationally movable barrel along the optical axis. Accordingly, the solid-state image sensor mounted to the rectilinearly movable barrel by the solid-state-image-sensor holding member moves forward and backward along the optical axis, thereby allowing the adjustment of the flange-back length.

To achieve the above object, a second aspect of the present invention provides an image pick-up device according to the first aspect, wherein the fixed barrel, the rectilinearly movable barrel, the solid-state-image-sensor holding member, and the rotationally movable barrel comprise a material having a small thermal expansion coefficient.

According to the second aspect, the use of materials of small thermal expansion for the components makes it possible to adjust the flange-back length with high accuracy because of no influence from temperature change of using environment.

To achieve the above object, a third aspect of the present invention provides an image pick-up device according to the first or second aspect, wherein the driven gear portion and the driving gear portion are connected through an idle gear; the idle gear comprises a pair of gears arranged along a single axis and connected by a rotational urging member; and backlash between the driven gear portion and the driving gear portion is eliminated by urging the pair of gears in opposite directions to each other by the rotational urging member.

According to the third aspect, the driven gear portion of the rotationally movable barrel and the driving gear portion of the adjusting shaft are connected by the idle gear to eliminate the backlash occurring in the connecting portion therebetween, thereby allowing the adjustment of the flange-back length with further higher accuracy.

To achieve the above object, a fourth aspect of the present invention provides an image pick-up device according to first to third aspects, further comprising a shutter device which shuts light coming to the solid-state image sensor in order to adjust the black-level of a signal outputted from the solid-state image sensor.

According to the fourth aspect, the provision with the shutter device which shuts light coming to the solid-state image sensor allows easy adjustment of the black level of a signal outputted from the solid-state image sensor.

The image pick-up device according to the present invention allows adjustment of the flange-back length with high accuracy.

To achieve the above object, a fifth aspect of the present invention provides an adjustment mechanism which adjusts a position of a solid-state image sensor equipped with an image pick-up device, the adjustment mechanism comprising a fixed barrel which is fixed to a body of the image pick-up device, a rectilinearly movable barrel which has a distal end fitted into the fixed barrel and rectilinearly moves along an optical axis, a solid-state-image-sensor holding member which is provided to the rectilinearly movable barrel and holds the solid-state image sensor, a rotationally movable barrel which moves forward and backward along the optical axis with rotation, and has a female screw portion provided to an inner periphery of the rotationally movable barrel, the female screw portion being screwed on a male screw portion provided to an outer periphery of the fixed barrel, an adjusting shaft which has a driving gear portion connected to a driven gear portion provided in an outer periphery of the rotationally movable barrel, a connecting portion which is provided to the rotationally movable barrel, is fitted into a groove formed in an outer periphery of the rectilinearly movable barrel, and connects the rotationally movable barrel and the rectilinearly movable barrel, a first urging member which is interposed between the connecting portion and one inner wall of the groove and eliminates backlash between the connecting portion and the groove by pressing the connecting portion against the other inner wall of the groove, and a second urging member which is interposed between the fixed barrel and the rectilinearly movable barrel and eliminates backlash between the female screw portion and the male screw portion by urging the rectilinearly movable barrel backward along the optical axis against the fixed barrel, wherein rotation of the adjusting shaft is transmitted to the rotationally movable barrel through the driving gear portion and the driven gear portion so as to move the rotationally movable barrel with rotation along the optical axis, so that the rectilinearly movable barrel is rectilinearly moved along with the rotationally movable barrel along the optical axis through the groove and the connecting portion, thereby adjusting the position of the solid-state image sensor.

To achieve the above object, a sixth aspect of the present invention provides an adjustment mechanism according to the fifth aspects, wherein the fixed barrel, the rectilinearly movable barrel, the solid-state-image-sensor holding member, and the rotationally movable barrel comprise a material having a small thermal expansion coefficient.

To achieve the above object, a seventh aspect of the present invention provides an adjustment mechanism according to the fifth or sixth aspects, wherein the driven gear portion and the driving gear portion are connected through an idle gear, the idle gear comprises a pair of gears arranged along a single axis and connected by a rotational urging member, and backlash between the driven gear portion and the driving gear portion is eliminated by urging the pair of gears in opposite directions to each other by the rotational urging member.

To achieve the above object, a eighth aspect of the present invention provides an adjustment mechanism according to the fifth to seventh aspects, further comprising a shutter device which shuts light coming to the solid-state image sensor in order to adjust the black-level of a signal outputted from the solid-state image sensor.

The adjustment mechanism according to the present invention allows adjustment of the flange-back length with high accuracy.

DETAILED DESCRIPTION OF THE PREFERRED EMBODIMENTS

A best mode for implementing an image pick-up device and an adjustment mechanism according to the present invention will be described with reference to appended drawings.

Figure 1:
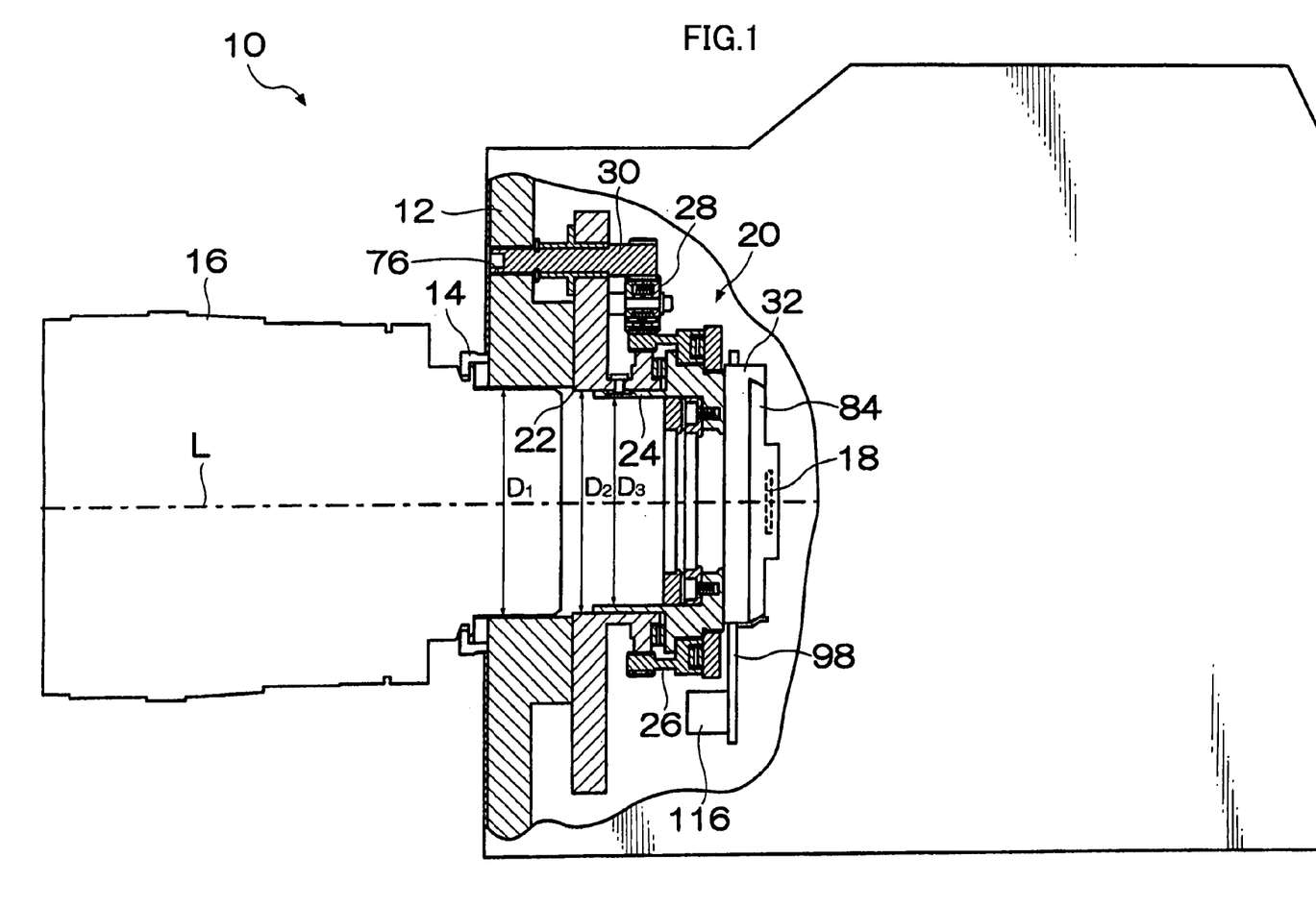
FIG. 1 is a partial side section view for showing an embodiment of an image pick-up device according to the present invention.

FIG. 1 is a partial side section view for showing an embodiment of an image pick-up device according to the present invention. The image pick-up device 10 is an image pick-up device for cinematography, which is used with a lens 16 being mounted to a lens mount 14 provided to the front side of a camera frame 12 thereof (device body). Image pick-up operation is performed by a solid-state image sensor (CCD in this embodiment) 18. The CCD 18 is provided movably in forward and backward direction by a flange-back adjusting mechanism 20, thereby allowing adjustment of the flange back length.

Figure 2:
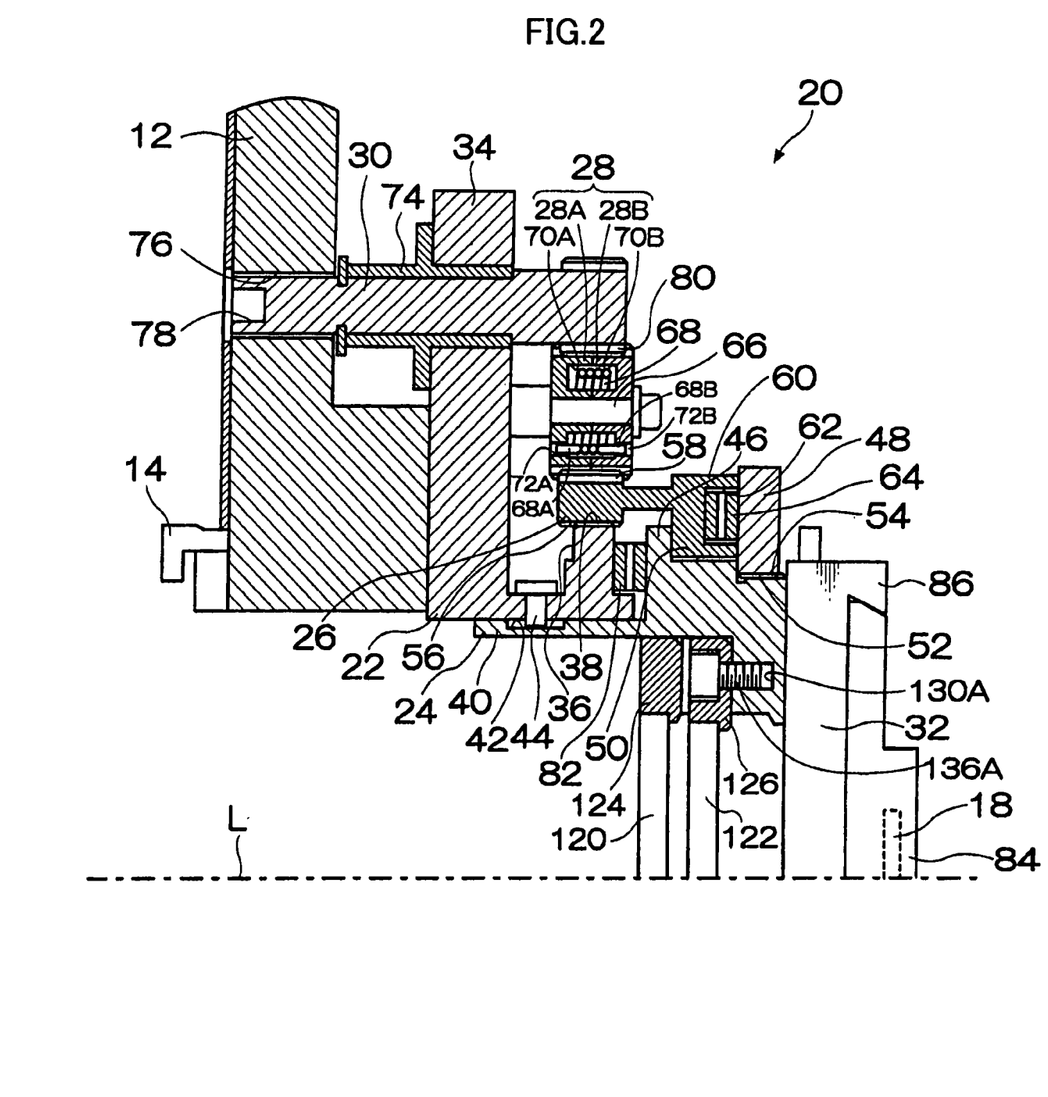
FIG. 2 is a side section view for showing configuration of a flange-back adjusting mechanism.

FIG. 2 is a side section view for showing an embodiment of an adjustment mechanism according to the present invention. The flange-back adjustment mechanism 20 mainly comprises a fixed barrel 22, a rectilinearly movable barrel 24, a rotationally movable 26, an idle gear 28, an adjusting shaft 30, and a CCD carrier 32.

The fixed barrel 22 has a first flange portion 34 at the outer periphery of its distal end. The first flange portion 34 is fixed to the camera frame 12 with bolts (not shown). The fixed barrel 22 has a second flange portion 36 at the outer periphery of its proximal end. The second flange portion 36 has a mail screw portion 38 at its outer periphery.

The rectilinearly movable barrel 24 has at its distal end, a distal end fitting portion 40 that has a outside diameter substantially equal to the inside diameter of the fixed barrel 22 and is fitted against the inner periphery of the fixed barrel 22, so that the rectilinearly movable barrel 24 can move forward and backward along optical axis L. A rectilinear groove 42 is provided along optical axis L in the outer periphery of the distal end fitting portion. A guide pin 44 provided to the fixed barrel 22 is fitted into the rectilinear groove 42. The rectilinearly movable barrel 24 moves forward and backward along optical axis L with limited circumferential rotation due to the action of the guide pin 44 and the rectilinear groove 42.

To the outer periphery of the rectilinearly movable barrel 24 are provided an outer flange portion 46 and a pressing ring 48, defining a groove 50 with a predetermined width. The pressing ring 48 is mounted to the rectilinearly movable barrel 24 by screwing a female screw portion 52 formed in the inner periphery of the pressing ring 48 onto a male screw portion 54 formed in the outer periphery of the proximal end of the rectilinearly movable 24. The pressing ring 48 mounted to the rectilinearly movable barrel 24, and the outer flange portion 46 define the groove 50 with a predetermined width.

The rotationally movable barrel 26 has a female screw portion 56 in the inner periphery of its distal end. The female screw portion 56 is screwed on a mail screw portion 38 formed in the second flange portion 36 of the fixed barrel 22. The rotationally movable barrel 26 is rotated so that it moves forward and backward along optical axis L with rotation by interaction of the mail screw portion 38 and the female screw portion 56.

A driven gear portion 58 is provided to the outer periphery of its distal end of the rotationally movable barrel 26. A connecting portion 60 is formed in the proximal end of the rotationally movable barrel 26. The connecting portion 60 has a width substantially same as the groove 50 formed in the rectilinearly movable barrel 24, and is fitted into the groove 50. In the rear end face of the connecting portion 60 is formed a spring receiving groove 62 circumferentially, which receives a spring 64. The spring 64 extends between the connecting portion 60 and the pressing ring 48, so that the distal end face of the connecting portion 60 is pressed against the rear end face of the outer flange portion 46 (the inner wall face of the front side of the groove 50). This eliminates the backlash of the connecting portion 60 fitted into the groove 50 between the outer flange portion 46 and the pressing ring 48.

The idle gear 28 is supported rotatably on a rotational shaft 66 mounted to the first flange portion 34 of the fixed barrel 22 in parallel with optical axis L, and engages with the driven gear portion 58 provided to the rotationally movable barrel 26. The idle gear 28 comprises a pair of gears 28A and 28B having the same configuration and coaxially arranged, which are connected with each other by a twisting ring 68 so as to be urged to rotate in opposite directions. The twisting spring 68 is received in spring receiving grooves 70A and 70B formed in the joint interface of the gears 28A and 28B. Hooks 68A and 68B of the opposite ends are engaged to engaging holes 72A and 72B formed in the spring receiving grooves 70A and 70B, so that the twisting spring 68 is connected to the gears 28A and 28B.

The adjusting shaft 30 is provided in parallel with optical axis L, and rotatably supported on a bush 74 mounted to the first flange portion 34 of the fixed barrel 22. The distal end of the adjusting shaft 30 is fitted into a through hole 76 formed in the front face of the camera frame 12. A hexagonal hole 78 is formed in the distal end face of the through hole 76. The adjusting shaft 30 is rotated with a hexagonal wrench fitted into the hexagonal hole 78.

A driving gear portion 80 is provided to the proximal end of the adjusting shaft 30, and engages with the idle gear 28. Thus, when the adjusting shaft 30 is rotated, this rotation is transmitted to the idle gear 28 through the driving gear portion 80, and the rotation of the idle gear 28 is transmitted to the rotationally movable barrel 26 through the driven gear portion 58.

The pair of gears 28A and 28B constituting the idle gear 28 are urged by the twisting spring 68 to rotate in opposite directions to each other, as described above. Accordingly, the driving gear portion 80 and the driven gear portion 58 engages with the idle gear 28 with the gear faces being pressed against the gears 28A and 28B constituting the idle gear 28, at the engaging portions. This eliminates the backlash of the engaging portions.

A spring 82 is also interposed between the fixed barrel 22 and the rectilinearly movable barrel 24 and eliminates the backlash of screwed portion of the rotationally movable barrel 26 and the fixed barrel 22. The spring 82 is disposed between the second flange portion 36 of the fixed barrel 22 and the outer flange portion 46 of the rectilinearly movable barrel 24, and extends to press the rectilinearly movable barrel 24 backward. Accordingly, the rotationally movable barrel 26 connected to the rectilinearly movable 24 through the connecting portion 60 is pressed backward, thereby eliminating the backlash of the screwed portion of the rotationally movable barrel 26 and the fixed barrel 22, that is the backlash between the male screw portion 38 of the fixed barrel 22 and the female screw portion 56 of the rotationally movable barrel 26.

Figure 3:
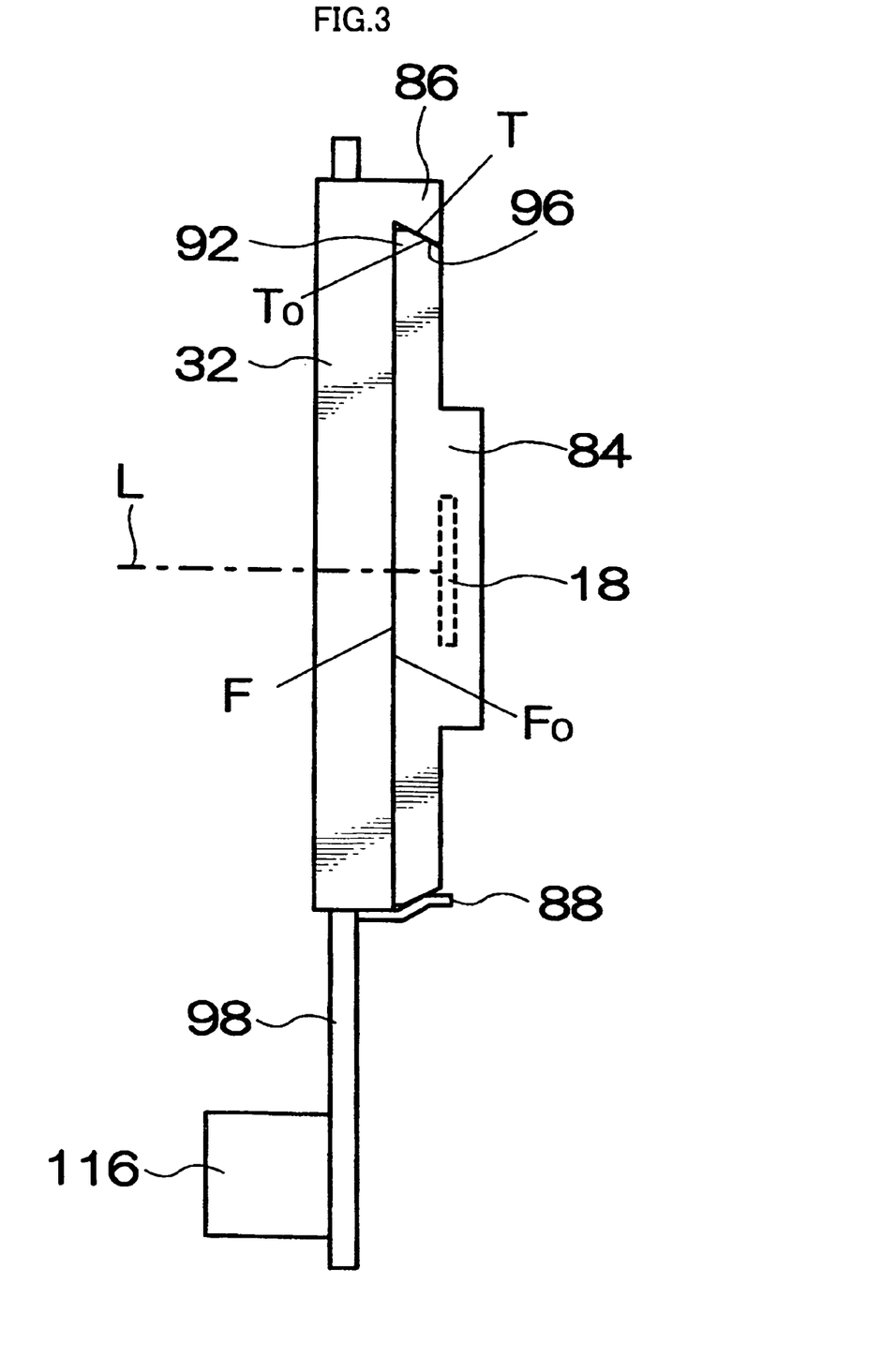
FIG. 3 is a side view for showing a configuration of a CCD carrier.
Figure 4:
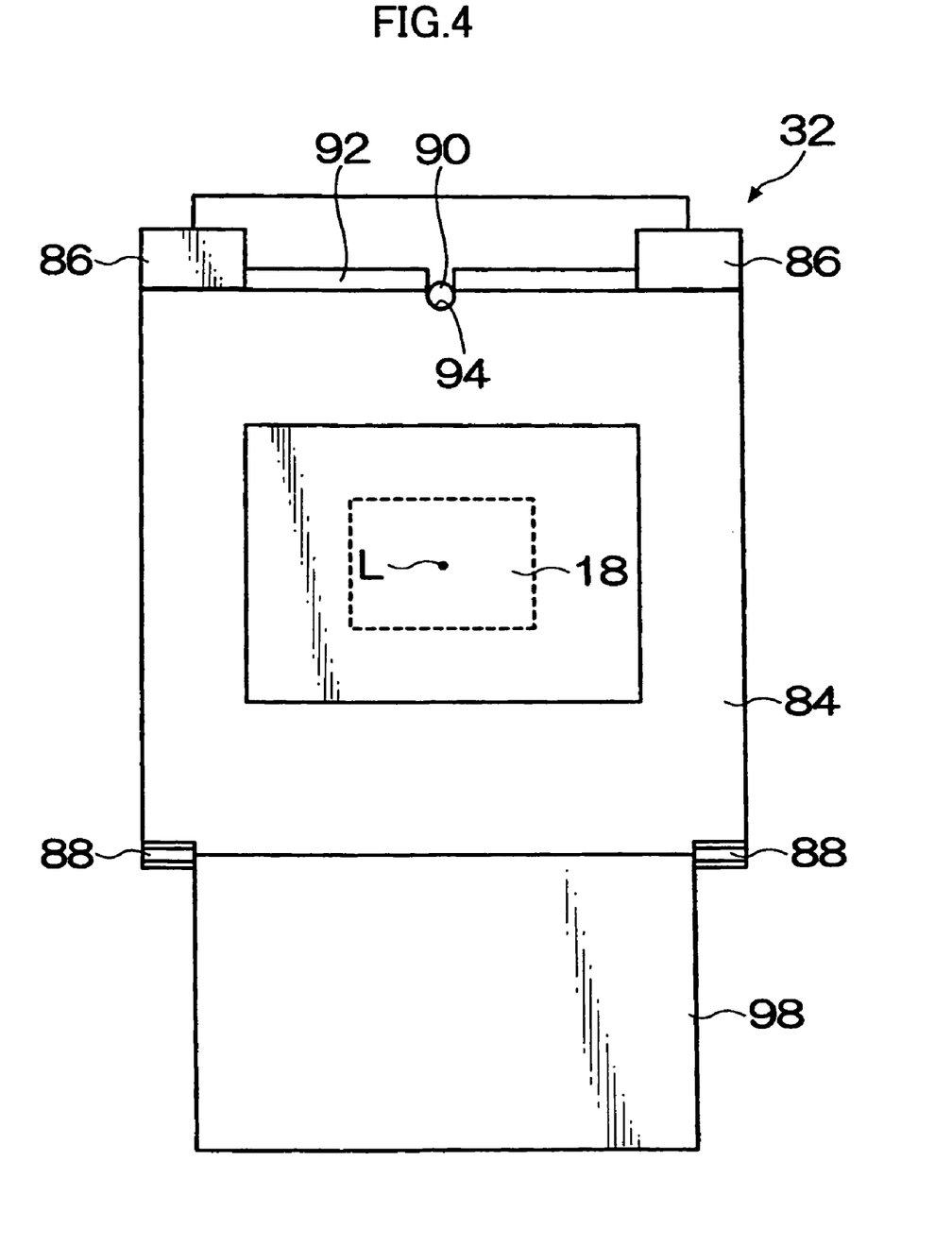
FIG. 4 is a rear view for showing a configuration of a CCD carrier.

The CCD carrier removably holds a CCD holder 84 having a CCD 18 mounted thereon. FIG. 3 and FIG. 4 are side and rear views of the CCD carrier. As shown in FIGS. 3 and 4, CCD carrier 32 has a mount reference face $F_0$ perpendicular to optical axis L. A pair of hooks 86 are provided on the upper end of the mount reference face $F_0$. A pair of pressing springs 88 are provided on the lower end of the mount reference face $F_0$. A positioning pin 90 is provided perpendicularly to the mount reference face $F_0$ between the pair of hooks 86.

The CCD holder 84 has a substantially rectangular plate shape, and has a flat mounting face F in its front side. A pin groove 94 into which the positioning pin 90 is fitted is formed in the center of the upper edge 92.

When the CCD holder 84 is mounted to the CCD carrier 32, the mounting face F of the CCD holder 84 is made contact with the mount reference face $F_0$ of the CCD carrier 32; the positioning pin 90 is fitted into the pin groove 94 formed in the upper edge 92; and the upper edge 92 is fitted into the grooves 96 formed in the hooks 86. Springs 88 are then engaged to the lower end to urge the CCD holder 84 upward.

The grooves 96 formed in the hooks 86 has a shape of sectional right triangle having an oblique face $T_0$ inclined with a predetermined angle (30° in this example) relative to the mount reference face $F_0$, as shown in FIG. 3. The upper edge 92 of the CCD holder 84, fitted into the grooves 96, has a shape of wedge having an oblique face T that has the same inclination (30°) as the oblique face $T_0$ of the groove 96.

Accordingly, when the upper edge 92 of the CCD holder 84 is fitted into the grooves 96 of the CCD carrier 32 and urged by the pressing spring 88, a force is generated for pressing the CCD holder 84 against CCD carrier 32 with aid of the opposing oblique faces $T_0$ and T so that the mounting face F of the CCD holder 84 is made contact with the mount reference face $F_0$ of the CCD carrier 32. Accordingly, the light receiving face of the CCD 18 is made to be perpendicular to optical axis L.

The CCD holder 84 is positioned in vertical direction with the upper edge 92 thereof being fitted into and engaging to the grooves 96 of the CCD carrier 32. Thus, the center in the height direction of the CCD 18 coincides with optical axis L.

The CCD holder 84 is positioned in horizontal direction with the positioning pin 90 being fitted into the pin groove 94 formed in the upper edge 92. Thus, the center in the width direction of the CCD 18 coincides with optical axis L.

As described above, the upper edge 92 of the CCD holder 84 is fitted into the grooves 96 of the CCD carrier 32, and the lower edge is made in engagement by the pressing springs 88, so that CCD holder 84 is mounted to the CCD carrier 32, and the CCD 18 mounted to the CCD holder 84 is positioned at a predetermined position.

A shutter unit 98 is mounted to the CCD carrier 32. The shutter unit 98 prevents the light incidence to CCD 18 mounted to the CCD carrier 32, if necessary.

Figure 5A:
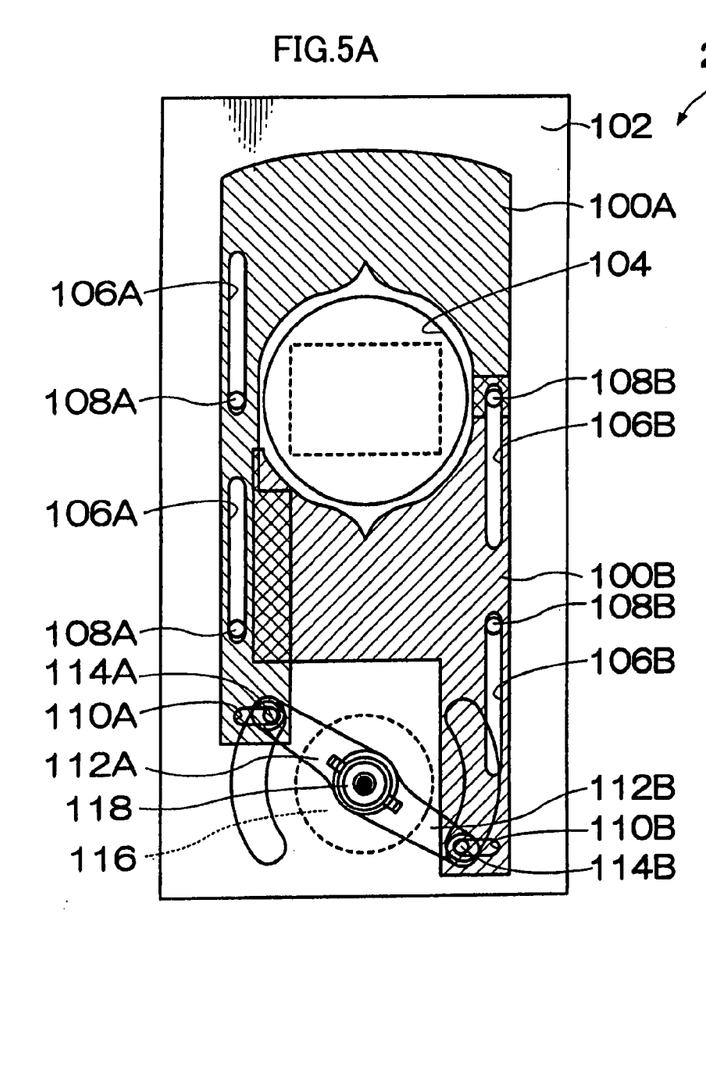
FIGS. 5A and 5B are front views for showing a configuration of a shutter unit.
Figure 5B:
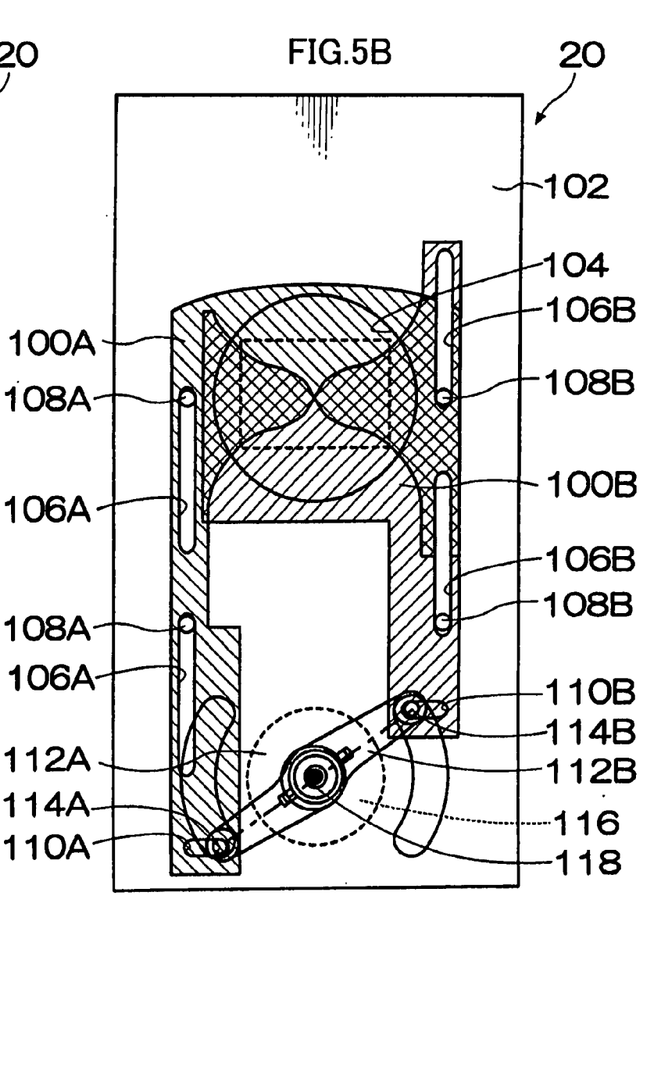

FIGS. 5A and 5B are front views for showing a configuration of a shutter unit 98: FIG. 5A shows a shutter-opened state, and FIG. 5B shows a shutter-closed state. As shown in the figures, the shutter unit 98 is operated such that a circular opening 104 formed in a shutter base plate 102 is opened and closed by vertically moving two shutter blades 100A and 100B.

Guide grooves 106A and 106B are formed along edges of the two blades 100A and 100B, respectively. Guide pins 108A and 108B disposed vertically on the shutter base plate 102 are fitted into the guide grooves 106A and 106B, respectively.

Connection grooves 110A and 110B are formed in the lower edges of the shutter blade 100A and 100B, respectively. Connecting pin 114A and 114B disposed on the distal ends of the swing arms 112A and 112B are fitted into the connection grooves 110A and 110B, respectively.

The swing arms 112A and 112B are attached to a rotational shaft 118 of a motor 116. The normal and reverse rotation of the motor 116 causes the swing arms 112A and 112B to swing. The swing of the swing arms 112A and 112B causes the two shutter blade 100A and 100B to move vertically with guided by the guide pins 108A and 108B through the guide grooves 106A and 106B, thereby opening and closing the opening 104.

A band-pass filter 120 and low-pass filter 122 are mounted to the rectilinearly movable barrel 24, for selectively passing only light of predetermined wavelengths.

Figure 6:
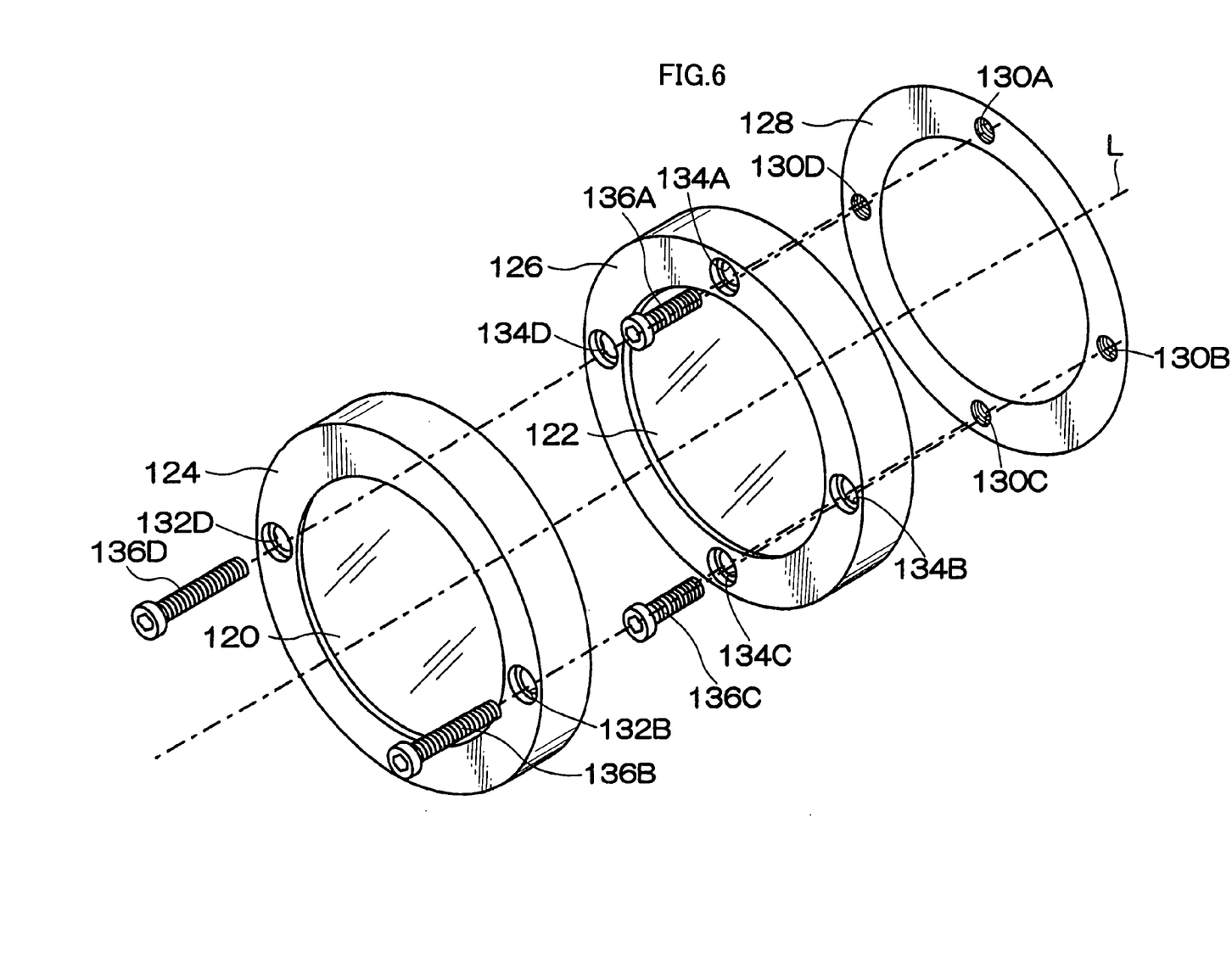
FIG. 6 is a perspective view for showing a structure of mounting of a band-pass filter and a low-pass filter.

FIG. 6 is a perspective view for showing a structure of mounting of the band-pass filter 120 and the low-pass filter 122.

As shown in the figure, the band-pass filter 120 is held on a band-pass filter holding frame 124, and the low-pass filter 122 is held on a low-pass filter holding frame 126 so as to be mounted to an inner flange portion 128 provided to the inner periphery of the rectilinearly movable barrel 24.

Four bolt holes 130A, 130B, 130C, and 130D are formed in the edge of the inner flange 128 with the same intervals in the same circle. Two through holes 132B, and 132D are formed in the band-pass filter holding frame 124 with the same intervals in the same circle. Four through holes 134A, 134B, 134C, and 134D are formed in the low-pass filter holding frame 126 with the same intervals in the same circle.

When mounting the band-pass filter 120 and the low-pass filter 122, the low-pass filter 122 is fitted into the rectilinearly movable barrel 24; then, the positions of the through holes 134A to 134D formed in the low-pass filter holding frame 126 are aligned to the positions of the bolt holes 130A to 130D formed in the inner flange portion 128 of the rectilinearly movable barrel 24. Then, bolts 136A and 136C are inserted into two of the through holes, 134A and 134C to be screwed into the bolt holes 130A and 130C. Thus, the low-pass filter 122 is mounted to the rectilinearly movable barrel 24.

Next, the band-pass filter 120 is fitted into the rectilinearly movable barrel 24, and the positions of the through holes 132B and 132D formed in the band-pass filter holding frame 124 are aligned to the positions of the bolt holes 130B and 130D formed in the inner flange portion 128 of the rectilinearly movable barrel 24. Then, bolts 136B and 136D are inserted into the through holes 132B and 132D to be screwed into the bolt holes 130B and 130D. Thus, the band-pass filter 120 is mounted to the rectilinearly movable barrel 24.

The mounting of the band-pass filter 120 and the low-pass filter 122 as described above allows the removal of only the band-pass filter 120 for maintenance operation, thereby improving easiness of maintenance.

The image pick-up device 10 is configured so that the inside diameter of components in subsequent stages with respect the lens mount 14 deceases stepwise. For example, as shown in FIG. 1, the inside diameter of the fixed barrel 22, $D_2$, is smaller than the inside diameter of the opening of the camera frame 12, $D_1$, and the inside diameter of the rectilinearly movable barrel 24, $D_3$, is smaller than the inside diameter of the fixed barrel 22, $D_2$. Such stepwise reduction of the inside diameter starting from the opening of the lens mount 14 makes it possible to remove particles that may be attached on the step portions, from the opening of the lens mount 14, thereby improving easiness of maintenance.

Operation of the image pick-up device 10 of this embodiment configured as described above will be described.

As described above, the image pick-up device 10 of this embodiment has the flange-back adjusting mechanism 20, which can correct deviation of the flange-back length caused by lens replacement, by moving the CCD 18 along optical axis L forward and backward. The correction is performed as follow.

First, a hexagonal wrench is inserted into the through hole 76 formed in the front face of the camera frame 12, and then, the hexagonal wrench is fitted into the hexagonal hole 78 formed in the distal end face of the adjusting shaft 30. Then, the hexagonal wrench is rotated to cause the adjusting shaft 30 to be rotated.

The rotation of the adjusting shaft 30 is transmitted to the idle gear 28 through the driving gear portion 80, and the rotation of the idle gear 28 is transmitted to the rotationally movable barrel 26 through the driven gear portion 58.

The rotationally movable barrel 26 rotates due to the rotation of the idle gear 28 transmitted thereto, so that the rotationally movable barrel 26 moves forward and backward along optical axis L while rotating due to the interaction between the female screw portion 56 formed in the distal end of the rotationally movable barrel 26 and the male screw portion 38 formed in the second flange portion 36 of the fixed barrel 22. The forward and backward movement of the rotationally movable barrel 26 along optical axis L causes the rectilinearly movable barrel 24 connected to the connecting portion 60 of the rotationally movable barrel 26 through the groove 50, to move forward and backward along optical axis L. Accordingly, the CCD 18 fixed to the rectilinearly movable barrel 24 through the CCD carrier 32 moves forward and backward along optical axis L, thereby correcting the flange-back length.

As described above, the image pick-up device 10 of this embodiment makes it possible to easily adjust the flange-back length only by rotating the adjusting shaft 30 with the hexagonal wrench via through hole 76 formed in the front face of the camera frame 12.

Further, in the image pick-up device 10 of this embodiment, the idle gear 28 for transmitting the rotation of the adjusting shaft 30 to the rotationally movable barrel 26 is constituted of the pair of gears 28A and 28B, which are urged by the twisting spring 68 in opposite directions to each other, thereby eliminating the backlash of the engaging portion. Accordingly, the rotation of the adjusting shaft 30 can be transmitted accurately to the rotationally movable barrel 26 without occurrence of backlash.

Moreover, the backlash between the female screw portion 56 of the rotationally movable barrel 26 and the male screw portion 38 of the fixed barrel 22 is eliminated by interposing the spring 82 between the fixed barrel 22 and the rectilinearly movable barrel 24, thereby making it possible to rotationally move the rectilinearly movable barrel 24 with high accuracy without occurrence of backlash.

Furthermore, the interposition of the spring 64 between the groove 50 and the connecting portion 60, which connect the rectilinearly movable barrel 24 and the rotationally movable barrel 26, eliminates the backlash, thereby making it possible to transmit the motion of the rotationally movable barrel 26 to the rectilinearly movable barrel 24 with high accuracy.

As described above, since the image pick-up device 10 of this embodiment is free of backlash that otherwise may occur in the connecting portion, the CCD 18 can be moved forward and backward along optical axis L with high accuracy, and the flange-back length can be adjusted with high accuracy.

The materials of the components constituting the flange-back adjusting mechanism 20 have not been mentioned in the description of the above embodiment. Note that each of the components constituting the flange-back adjusting mechanism 20 is preferably made from material of small thermal expansion, such as nickel-iron alloy or titanium, in order to reduce the change of the flange-back length due to thermal expansion. However, not all components have to be made from material of small thermal expansion. For example, the change of flange-back length due to thermal expansion can also be substantially reduced when the fixed barrel 22, the rectilinearly movable barrel 24 and the CCD carrier 32 are made from nickel-iron alloy, the rotationally movable barrel 26 is made from titanium, and the other components are made from materials that do not have small thermal expansion.

In the above embodiment, the rotation of the adjusting shaft 30 is transmitted to the rotationally movable barrel 26 through the idle gear 28. However, the rotation of the adjusting shaft 30 may also be transmitted to the rotationally movable barrel 26, directly, with the driving gear portion 80 of the adjusting shaft 30 being engaged with the driven gear portion 58 of the rotationally movable barrel 26.

In the above embodiment, the adjusting shaft 30 is rotated using a hexagonal wrench with the hexagonal hole 78 formed in the distal end of the adjusting shaft 30. However, the technique for rotating the adjusting shaft 30 is not limited to this. For example, the adjusting shaft 30 may be rotated by hand using a knob provided to the distal end of the adjusting shaft 30. The rotation may be caused by a motor.

The shutter unit 98 mounted to the CCD carrier 32 is used for adjustment of the black level of the CCD 18. A method for adjusting of the black level of the CCD 18 using the shutter unit 98 will be described.

Figure 7:
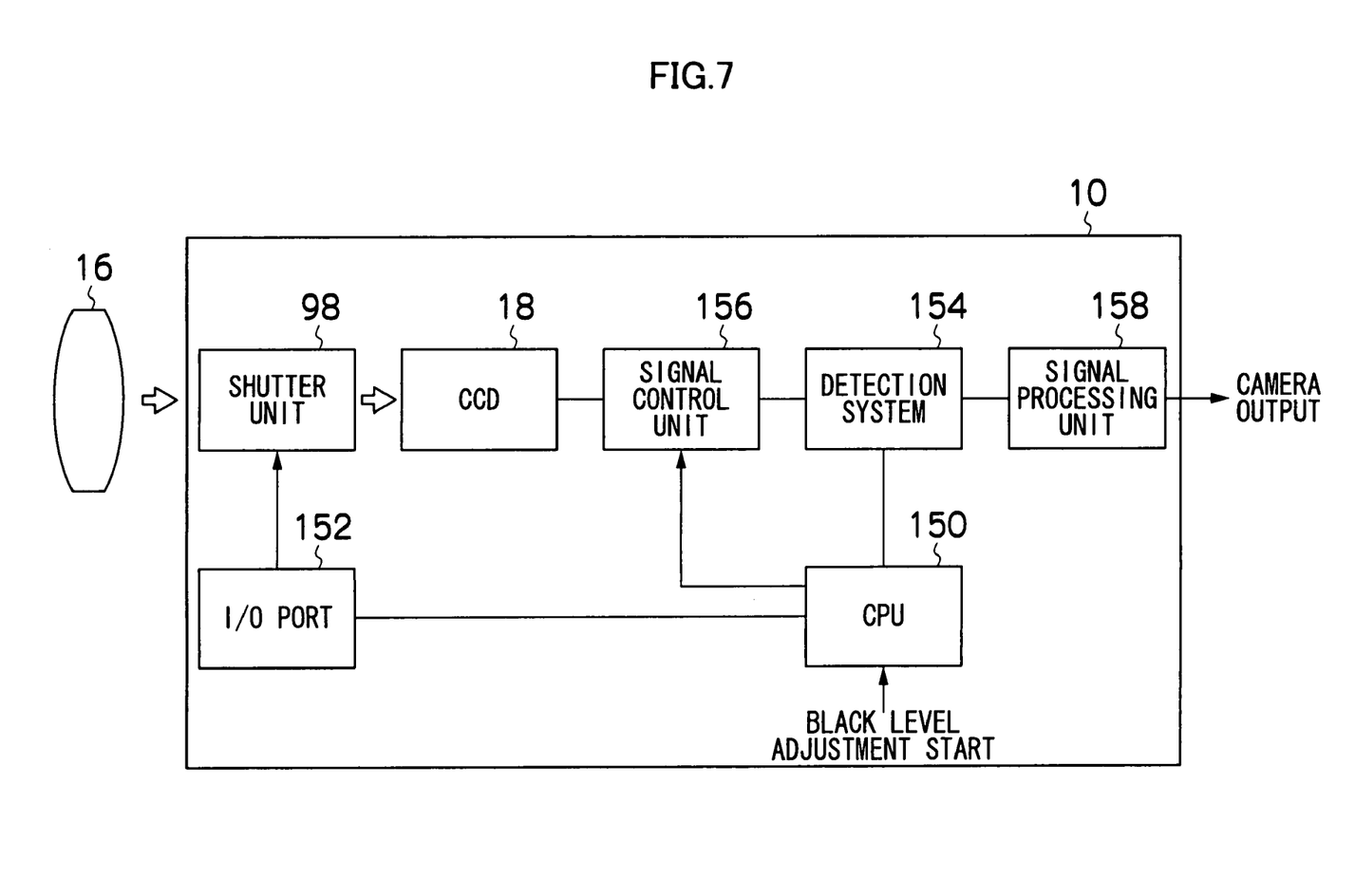
FIG. 7 is a block diagram for showing an electrical configuration of an image pick-up device.

FIG. 7 is a block diagram for showing an electrical configuration of the image pick-up device 10.

In normal image pick-up operation, the shutter unit 98 is in the shutter-opened state (refer to FIG. 5A), and light incident on the lens 16 passes the opening 104 of the shutter unit 98, and reach the light receiving face of the CCD 18. The light is converted to an electrical signal at the CCD 18, and then outputted through signal circuits from a signal processing unit 158 as camera output.

Instructions for execution of black level adjustment are generated in an operation unit (not shown). When an instruction for execution of black level adjustment is generated by the operation unit, the CPU 150 outputs a command for directing the shutter unit 98 to close the shutter, through an I/O port 152. On receiving the command of shutter close, the shutter unit 98 drives the motor 116 to slide the shutter blades 100A and 100B so as to close the opening 104 (refer to FIG. 5B). Thus the CCD 18 is shielded from light.

In this light shield state, a video signal is detected by a detection system 154, and the levels of R, G and B are adjusted by outputting control signals from the CPU 150 to a signal control unit 156, so that the video signal becomes electrically black. The level adjustment is repeated until the detection system 154 outputs a right detection result. On completion of the adjustment, the CPU 150 outputs a command for directing the shutter unit 98 to close the shutter, through the I/O port 152. On receiving the command of shutter open, the shutter unit 98 drives the motor 116 to slide the shutter blades 100A and 100B so as to open the opening 104 (refer to FIG. 5A). Thus, the status returns to the normal image pick-up operation mode, and light coming through the lens 16 reaches the CCD 18.

As described above, since the image pick-up device 10 of this embodiment has the shutter unit 98, there is no necessity for light shield using a lens cap, thereby enabling easy adjustment of the black level.

In the above example, the adjustment of the black level is performed using an instruction for execution of black level adjustment as a trigger. However, the method of performing the black level adjustment is not limited to this.

In the above embodiment, the shutter is opened and closed by driving the motor 116, but it may be opened and closed by manual operation.

The configuration of the shutter unit is not limited to that of the above embodiment, and may be another shutter unit configuration.

What is claimed is:

1. An image pick-up device which has a lens removably mounted to a lens mount provided to a device body, and receives light coming through the lens by a solid-state image sensor, the image pick-up device comprising:
   a fixed barrel which is fixed to the device body;
   a rectilinearly movable barrel which has a distal end fitted into the fixed barrel and rectilinearly moves along an optical axis;
   a solid-state-image-sensor holding member which is provided to the rectilinearly movable barrel and holds the solid-state image sensor;
   a rotationally movable barrel which moves forward and backward along the optical axis with rotation, and has a female screw portion provided to an inner periphery of the rotationally movable barrel, the female screw portion being screwed on a male screw portion provided to an outer periphery of the fixed barrel;

an adjusting shaft which has a driving gear portion connected to a driven gear portion provided in an outer periphery of the rotationally movable barrel;

a connecting portion which is provided to the rotationally movable barrel, is fitted into a groove formed in an outer periphery of the rectilinearly movable barrel, and connects the rotationally movable barrel and the rectilinearly movable barrel;

a first urging member which is interposed between the connecting portion and one inner wall of the groove and eliminates backlash between the connecting portion and the groove by pressing the connecting portion against the other inner wall of the groove; and a second urging member which is interposed between the fixed barrel and the rectilinearly movable barrel and eliminates backlash between the female screw portion and the male screw portion by urging the rectilinearly movable barrel backward along the optical axis against the fixed barrel, wherein rotation of the adjusting shaft is transmitted to the rotationally movable barrel through the driving gear portion and the driven gear portion so as to move the rotationally movable barrel with rotation along the optical axis, so that the rectilinearly movable barrel is rectilinearly moved along with the rotationally movable barrel along the optical axis through the groove and the connecting portion, thereby adjusting the position of the solid-state image sensor.

2. The image pick-up device according to claim 1, wherein the fixed barrel, the rectilinearly movable barrel, the solid-state-image-sensor holding member, and the rotationally movable barrel comprise a material having a small thermal expansion coefficient.

3. The image pick-up device according to claim 1, wherein the driven gear portion and the driving gear portion are connected through an idle gear;

the idle gear comprises a pair of gears arranged along a single axis and connected by a rotational urging member; and backlash between the driven gear portion and the driving gear portion is eliminated by urging the pair of gears in opposite directions to each other by the rotational urging member.

4. The image pick-up device according to claim 2, wherein the driven gear portion and the driving gear portion are connected through an idle gear;

the idle gear comprises a pair of gears arranged along a single axis and connected by a rotational urging member; and backlash between the driven gear portion and the driving gear portion is eliminated by urging the pair of gears in opposite directions to each other by the rotational urging member.

5. The image pick-up device according to claim 1, further comprising a shutter device which shuts light coming to the solid-state image sensor in order to adjust the black-level of a signal outputted from the solid-state image sensor.

6. The image pick-up device according to claim 2, further comprising a shutter device which shuts light coming to the solid-state image sensor in order to adjust the black-level of a signal outputted from the solid-state image sensor.

7. The image pick-up device according to claim 3, further comprising a shutter device which shuts light coming to the solid-state image sensor in order to adjust the black-level of a signal outputted from the solid-state image sensor.

8. The image pick-up device according to claim 4, further comprising a shutter device which shuts light coming to the solid-state image sensor in order to adjust the black-level of a signal outputted from the solid-state image sensor.

9. An adjustment mechanism which adjusts a position of a solid-state image sensor equipped with an image pick-up device, the adjustment mechanism comprising;

a fixed barrel which is fixed to a body of the image pick-up device;

a rectilinearly movable barrel which has a distal end fitted into the fixed barrel and rectilinearly moves along an optical axis;

a solid-state-image-sensor holding member which is provided to the rectilinearly movable barrel and holds the solid-state image sensor;

a rotationally movable barrel which moves forward and backward along the optical axis with rotation, and has a female screw portion provided to an inner periphery of the rotationally movable barrel, the female screw portion being screwed on a male screw portion provided to an outer periphery of the fixed barrel;

an adjusting shaft which has a driving gear portion connected to a driven gear portion provided in an outer periphery of the rotationally movable barrel;

a connecting portion which is provided to the rotationally movable barrel, is fitted into a groove formed in an outer periphery of the rectilinearly movable barrel, and connects the rotationally movable barrel and the rectilinearly movable barrel;

a first urging member which is interposed between the connecting portion and one inner wall of the groove and eliminates backlash between the connecting portion and the groove by pressing the connecting portion against the other inner wall of the groove; and a second urging member which is interposed between the fixed barrel and the rectilinearly movable barrel and eliminates backlash between the female screw portion and the male screw portion by urging the rectilinearly movable barrel backward along the optical axis against the fixed barrel, wherein rotation of the adjusting shaft is transmitted to the rotationally movable barrel through the driving gear portion and the driven gear portion so as to move the rotationally movable barrel with rotation along the optical axis, so that the rectilinearly movable barrel is rectilinearly moved along with the rotationally movable barrel along the optical axis through the groove and the connecting portion, thereby adjusting the position of the solid-state image sensor.

10. The adjustment mechanism according to claim 9, wherein the fixed barrel, the rectilinearly movable barrel, the solid-state-image-sensor holding member, and the rotationally movable barrel comprise a material having a small thermal expansion coefficient.

11. The adjustment mechanism according to claim 9, wherein the driven gear portion and the driving gear portion are connected through an idle gear;

the idle gear comprises a pair of gears arranged along a single axis and connected by a rotational urging member; and backlash between the driven gear portion and the driving gear portion is eliminated by urging the pair of gears in opposite directions to each other by the rotational urging member.

12. The adjustment mechanism according to claim 10, wherein
   the driven gear portion and the driving gear portion are connected through an idle gear;
   the idle gear comprises a pair of gears arranged along a single axis and connected by a rotational urging member; and
   backlash between the driven gear portion and the driving gear portion is eliminated by urging the pair of gears in opposite directions to each other by the rotational urging member.

13. The adjustment mechanism according to claim 9, further comprising a shutter device which shuts light coming to the solid-state image sensor in order to adjust the black-level of a signal outputted from the solid-state image sensor.

14. The adjustment mechanism according to claim 10, further comprising a shutter device which shuts light coming to the solid-state image sensor in order to adjust the black-level of a signal outputted from the solid-state image sensor.

15. The adjustment mechanism according to claim 11, further comprising a shutter device which shuts light coming to the solid-state image sensor in order to adjust the black-level of a signal outputted from the solid-state image sensor.

16. The adjustment mechanism according to claim 12, further comprising a shutter device which shuts light coming to the solid-state image sensor in order to adjust the black-level of a signal outputted from the solid-state image sensor.

* * * * *